United States Patent
Marziano et al.

(10) Patent No.: US 12,471,988 B2
(45) Date of Patent: Nov. 18, 2025

(54) PULSED FIELD ABLATION SYNCHRONIZATION

(71) Applicant: BIOSENSE WEBSTER (ISRAEL) LTD., Yokneam (IL)

(72) Inventors: Lilah Marziano, Ganey-Tikva (IL); Roei Navot, Mishmar HaShiv'a (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 447 days.

(21) Appl. No.: 18/076,469

(22) Filed: Dec. 7, 2022

(65) Prior Publication Data
US 2024/0189021 A1   Jun. 13, 2024

(51) Int. Cl.
| | | |
|---|---|---|
| *A61B 18/14* | (2006.01) | |
| *A61B 5/352* | (2021.01) | |
| *A61B 5/355* | (2021.01) | |
| *A61B 18/00* | (2006.01) | |

(52) U.S. Cl.
CPC .......... *A61B 18/1492* (2013.01); *A61B 5/352* (2021.01); *A61B 5/355* (2021.01); *A61B 2018/00351* (2013.01); *A61B 2018/00577* (2013.01); *A61B 2018/00642* (2013.01); *A61B 2018/00839* (2013.01)

(58) Field of Classification Search
CPC .......... A61B 18/1492; A61B 5/349–36; A61B 2018/00351; A61B 2018/00577; A61B 2018/00642; A61B 2018/00839; A61B 5/35–366
See application file for complete search history.

(56) References Cited

U.S. PATENT DOCUMENTS

| | | |
|---|---|---|
| 5,391,199 A | 2/1995 | Ben-Haim |
| 5,443,489 A | 8/1995 | Ben Haim |
| 5,558,091 A | 9/1996 | Acker |
| 6,172,499 B1 | 1/2001 | Ashe |
| 6,239,724 B1 | 5/2001 | Doron |
| 6,332,089 B1 | 12/2001 | Acker |
| 6,484,118 B1 | 11/2002 | Govari |

(Continued)

FOREIGN PATENT DOCUMENTS

| | | |
|---|---|---|
| CN | 112914717 A | 6/2021 |
| WO | WO2022/134713 A1 | 6/2022 |

OTHER PUBLICATIONS

European Search Report for corresponding EPA No. 23214682.9 dated May 3, 2024.

*Primary Examiner* — Adam Z Minchella (57) ABSTRACT

Values of an R-to-end-of-T interval and an RR interval for multiple ECG cycles of a patient are obtained. Based on the values, a relationship between the RR interval and the R-to-end-of-T interval or another variable derived therefrom is computed, the relationship being for use in computing a delay from an R-peak of any subsequent ECG cycle of the patient to a time window in which to apply PFA to the patient's heart such that the time window is expected to start after an end of a T-wave of the subsequent ECG cycle and to end prior to a QRS-wave immediately following the subsequent ECG cycle. Subsequently, during a PFA procedure, a current cycle length or heart rate of the patient is obtained, the delay is computed, using the relationship, based on the current cycle length or heart rate, and PFA is applied during the time window following the delay.

18 Claims, 4 Drawing Sheets

(56) References Cited

U.S. PATENT DOCUMENTS

| | | |
|---|---|---|
| 6,618,612 B1 | 9/2003 | Acker |
| 6,690,963 B2 | 2/2004 | Ben Haim |
| 6,788,967 B2 | 9/2004 | Ben Haim |
| 6,892,091 B1 | 5/2005 | Ben Haim |
| 7,536,218 B2 | 5/2009 | Govari et al. |
| 7,756,576 B2 | 7/2010 | Levin |
| 7,848,787 B2 | 12/2010 | Osadchy |
| 7,869,865 B2 | 1/2011 | Govari et al. |
| 8,456,182 B2 | 6/2013 | Bar-Tal et al. |
| 10,271,893 B2 | 4/2019 | Stewart |
| 10,322,286 B2 | 6/2019 | Viswanathan |
| 11,033,329 B2 | 6/2021 | Stewart |
| 2005/0090867 A1 | 4/2005 | Lapanashvili |
| 2008/0114411 A1* | 5/2008 | Lian .................. A61B 5/349 607/25 |
| 2017/0027502 A1* | 2/2017 | Nikolic ............... A61B 5/316 |
| 2017/0035499 A1 | 2/2017 | Stewart |
| 2021/0077816 A1* | 3/2021 | Viswanathan ......... A61B 5/364 |
| 2021/0146126 A1* | 5/2021 | Waldstreicher ......... A61N 1/06 |
| 2021/0322086 A1* | 10/2021 | Gorzycki ........... A61B 18/1485 |
| 2022/0387095 A1* | 12/2022 | Neal, II ............ A61B 18/1492 |
| 2023/0190363 A1 | 6/2023 | Govari et al. |

\* cited by examiner

PULSED FIELD ABLATION SYNCHRONIZATION

FIELD OF THE DISCLOSURE

The present disclosure is related generally to the field of electrophysiology, and particularly to the administration of pulsed field ablation (PFA), e.g., for the treatment of cardiac arrhythmias.

BACKGROUND

In PFA, an electric field causes irreversible electroporation (IRE) of the cell membrane, thereby killing the cell. Typically, a PFA routine includes the application of a series of pulse trains, with an appropriate pause between each pair of successive pulse trains.

BRIEF DESCRIPTION OF THE DRAWINGS

The present disclosure will be more fully understood from the following detailed description of examples thereof, taken together with the drawings, in which.

DETAILED DESCRIPTION OF EXAMPLES

Overview

The present inventors have found that when applying PFA to a heart of a patient, it is advantageous to deliver the PFA pulse trains after the T-wave, but before the next QRS-wave, of the patient's electrocardiogram (ECG). If the PFA pulse trains are not timed in this manner, the pulse trains may trigger a tachycardia event.

However, it is challenging to time the PFA pulse trains in this manner. One reason for this challenge is the fact that although the R-peak of the QRS-wave can be identified in real-time, the end of the T-wave typically cannot.

To address this challenge, examples of the present disclosure provide a processor configured to compute a "recommended delay" from the R-peak to the start of a time window in which PFA may be applied safely. Advantageously, this time window is selected to begin soon after the T-wave, so as to avoid triggering a tachycardia event yet leave sufficient time to complete the PFA pulse trains before the next QRS-wave.

To compute the recommended delay, examples of the present disclosure capitalize on the observation that the amount of time between the R-peak and the end of the T-wave, referred to hereinbelow as the R-to-end-T interval, is generally related to the cycle length of the patient.

In particular, the processor first learns a relationship between the cycle length (or the heart rate, which is inversely proportional to the cycle length) and the R-to-end-T interval or another variable derived therefrom, such as a recommended-delay variable $D_{rec}$, based on one or more historical ECG signals acquired from the patient. (In each of the historical signals, the T-wave ends may be identified automatically, e.g., using a machine-learned model, or manually.) For example, using linear regression, the processor may learn a function $D_{rec}=aX+b$, where X is the RR interval, which is a measure of the cycle length. Subsequently, when applying PFA to the patient, the processor may, in real-time, detect an R-peak, obtain the current cycle length or heart rate, use the relationship to compute the recommended delay from the R-peak based on the current cycle length or heart rate, and then begin the pulse-train delivery following the recommended delay.

System Description

Figure 1:
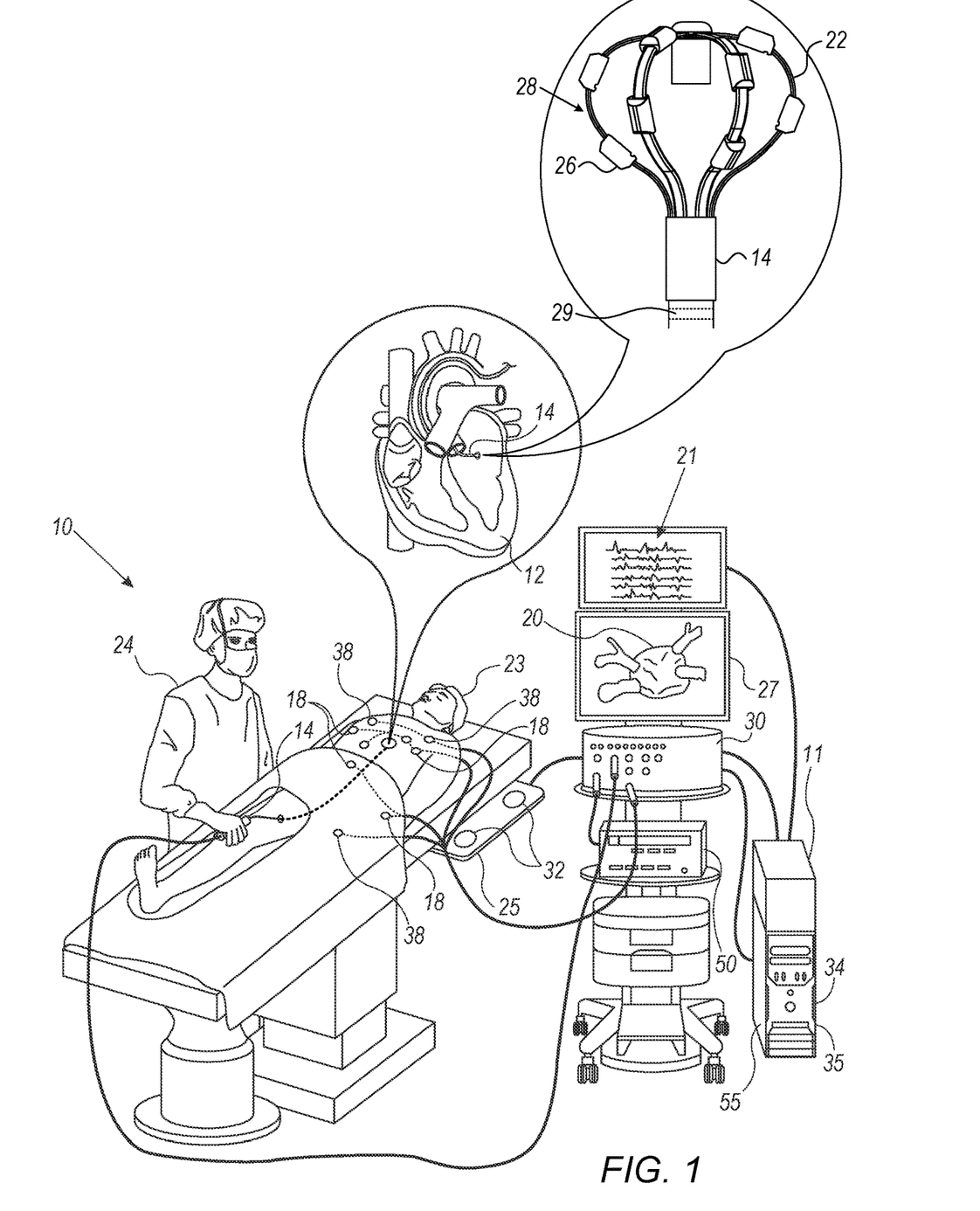
FIG. 1 is a schematic illustration of an example electrophysiology mapping and ablation system, in accordance with some examples of the present disclosure.

Reference is initially made to FIG. 1, which is a schematic illustration of an example electrophysiology mapping and ablation system 10, in accordance with some examples of the present disclosure. One commercial product embodying elements of system 10 is available as the CARTO™ 3 System, available from Biosense Webster, Inc., 31A Technology Drive, Irvine, CA 92618.

System 10 comprises one or more catheters, which are percutaneously inserted by a physician 24 into the body of a patient 23. Following the insertion of each catheter, physician 24 navigates the catheter through the vascular system of patient 23 into a chamber or vascular structure of the patient's heart 12. Typically, the catheters are navigated through a delivery catheter (not shown). The catheters may include a catheter for sensing intracardiac electrogram (IEGM) signals, a catheter for ablating cardiac tissue, and/or a catheter for both sensing and ablating.

For example, an exemplary catheter 14 configured for both sensing and pulsed field ablation (PFA) causing irreversible electroporation (IRE) is shown in FIG. 1. Catheter 14 comprises multiple electrodes 26 optionally distributed over a plurality of splines 22 at a distal end 28 of the catheter. Electrodes 26 are configured to sense IEGM signals from the tissue and to apply PFA pulses to the tissue, e.g., as described in co-assigned U.S. application Ser. No. 17/559,558 to Govari et al.

Typically, catheter 14 further comprises a tracking sensor 29 for tracking the three-dimensional (3D) location and orientation of distal end 28. Tracking sensor 29 may be embedded in or near distal end 28.

Typically, tracking sensor 29 comprises three magnetic coils. A location pad 25, which comprises a plurality of magnetic coils 32 configured to generate a magnetic field in a predefined working volume, is positioned near (e.g., underneath) patient 23. Based on signals induced in the coils by the magnetic field, the location and orientation of distal end 28 is tracked. Details of such magnetic-based tracking are described in U.S. Pat. Nos. 55,391,199, 5,443,489, 5,558,091, 6,172,499, 6,239,724, 6,332,089, 6,484,118, 6,618,612, 6,690,963, 6,788,967, and 6,892,091.

Typically, system 10 further comprises one or more electrode patches 38 configured to contact the skin of patient 23. Patches 38 may establish a location reference for location pad 25. Additionally, electrical current from electrodes 26 may be sensed at patches 38, and the location of each electrode 26 may be triangulated in response thereto. This location information may be combined with the information derived from the magnetic-based tracking described above so as to increase the precision of the tracking. Details of such impedance-based tracking technology are described in U.S. Pat. Nos. 7,536,218, 7,756,576, 7,848,787, 7,869,865, and 8,456,182.

System 10 further comprises a recorder 11 and a display 27. Recorder 11 is configured to record electrocardiogra (ECG) signals 21 acquired by body-surface ECG electrodes 18 and/or IEGM signals acquired by electrodes 26 of catheter 14, and optionally, to display these signals on display 27. Recorder 11 may also be configured to pace heart 12 and/or may be electrically connected to a standalone pacer.

System 10 further comprises an ablation-energy generator 50 configured to conduct ablative energy to one or more electrodes, such as electrodes 26, at the distal end of an ablation catheter, such as catheter 14. Energy produced by ablation-energy generator 50 may include, but is not limited to, radiofrequency (RF) energy and/or PFA energy, including monopolar or bipolar high-voltage direct-current (DC) pulses for effecting IRE, or combinations thereof. Ablation-energy generator 50 comprises energy-generating circuitry configured to produce the energy, along with a controller configured to control the circuitry and, optionally, perform other computational functions.

System 10 further comprises a workstation 55 comprising a processor 34, a memory 35, comprising a volatile memory and/or non-volatile memory that may store appropriate software instructions and/or data, and a user interface. Processor 34 may be configured to perform multiple functions, including, for example, (1) mapping the endocardial anatomy of heart 12 in 3D and rendering the resulting anatomical map 20 for display on display 27, (2) displaying, on display 27, activation sequences and/or other data compiled from ECG signals 21 in representative visual indicia or imagery superimposed on anatomical map 20, (3) displaying the real-time location and orientation of one or more catheters within the body of patient 23, and (4) displaying sites of interest, such as sites at which ablation energy has been applied.

System 10 further comprises a patient interface unit (PIU) 30, which is configured to establish electrical communication between power supplies, workstation 55, and the electrophysiological equipment belonging to the system. The electrophysiological equipment may comprise, for example, one or more catheters, location pad 25, ECG electrodes 18, electrode patches 38, ablation-energy generator 50, and/or recorder 11. Typically, PIU 30 further comprises another processor configured to compute of location and orientation of each of the catheters and to perform any relevant computations based on ECG signals 21.

In general, the term "processor," as used in the description and claims below, may refer to a single processor, such as processor 34, the controller of ablation-energy generator 50, or the processor of PIU 30. Alternatively, this term may refer to a cooperatively networked or clustered set of processors. For example, any of the functionality described hereinbelow may be performed cooperatively by some or all of processor 34, the controller of ablation-energy generator 50, and the processor of PIU 30. As a specific example, processor 34 may learn a relationship for use in computing a recommended delay for a patient, and the controller of ablation-energy generator 50 may then deliver PFA pulse trains to the patient in accordance with the relationship.

The functionality of each of the processors described herein may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software. For example, the processor may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Computing the Relationship

The processor is configured to obtain respective values of an R-to-end-of-T interval and a heart rate or cycle length for multiple electrocardiogram (ECG) cycles of a patient. Each of the values may be for a single ECG cycle, or may be an average over multiple ECG cycles.

Based on the obtained values, the processor computes a relationship that may be used, subsequently, to compute, for any subsequent ECG cycle of the patient, a recommended PFA delay, i.e., a delay from the R-peak of the subsequent ECG cycle to a time window in which to apply PFA to the heart of the patient such that the time window is expected to start after the end of the T-wave of the subsequent ECG cycle and to end prior to the QRS-wave of the patient immediately following the subsequent ECG cycle. The relationship may be in the form of a function or a lookup table.

In some examples, the relationship is between the RR interval (which is a measure of cycle length), represented herein by the variable "X," and a variable derived from the R-to-end-of-T interval, the R-to-end-of-T interval being represented below by the variable "D." In other examples, the relationship is between another measure of cycle length and the variable derived from the R-to-end-of-T interval. In yet other examples, the relationship is between the heart rate (which is inversely proportional to the cycle length) and the variable derived from the R-to-end-of-T interval.

For example, as further described below with reference to FIG. 2, the processor may compute a relationship between the RR interval and a variable "$D_{rec}$" representing the recommended delay. In such examples, each value $D_{rec\_i}$ of the variable $D_{rec}$ may be computed from the pair of values $(X_i, D_i)$ of the RR interval and R-to-end-of-T interval, as follows:

$$D_{rec\_i} = D_{min\_i} + |D_{max\_i} - D_{min\_i}|/c \qquad (1),$$

where:
$D_{min\_i} = p*D_i$, p being a predefined constant that is greater than or equal to one (e.g., 1.05-1.15),
$D_{max\_i} = X_i - L$, L being a duration of the time window, which is typically between 200 and 300 ms, and
c is another predefined constant that is greater than or equal to one (e.g., 3-5).
(Optionally, any given pair of values may be discarded– i.e., not used to compute the relationship–if $D_{max\_i} < D_{min\_i}$.)

Alternatively, $D_{rec\_i}$ may be computed as min (p' *$D_i$, $D_{max\_i}$), p' being another predefined constant that is greater than or equal to one. As yet another alternative, $D_{rec\_i}$ may be computed as $D_i+(D_{max\_i}-D_i)/c'$, $c'$ being another predefined constant that is greater than or equal to one.

In other examples, the relationship is between the RR interval and the R-to-end-of-T interval itself.

Subsequently to computing the relationship, during a PFA procedure on the patient, the processor may compute the RR interval $X_1$ of the patient. Subsequently, the processor may compute a recommended PFA delay $D_{rec\_1}$, by applying the relationship to $X_1$ and then performing any required additional computations on the result.

For example, for examples in which the relationship is between X and $D_{rec}$, the processor may simply apply the relationship to $X_1$ so as to calculate $D_{rec\_1}$. For examples in which the relationship is between X and D, the processor may apply the relationship to $X_1$ so as to calculate the expected value $D_1$ of the R-to-end-of-T interval, and then apply another relationship to $D_1$ so as to calculate $D_{rec\_1}$. For example, the processor may calculate $D_{rec\_1}$ as follows:

$$D_{rec\_1}=D_{min\_1}+(D_{max\_1}-D_{min\_1})/c \qquad (2),$$

where:
$D_{min\_1}=p*D_1$ for p as defined above,
$D_{max\_1}=X_1-L$ for L as defined above, and
c is as defined above.
(PFA is not performed if $D_{max\_1}<D_{min\_1}$.)

Alternatively, for example, the processor may calculate $D_{rec\_1}$ as min $(p'*D_1, D_{max\_1})$ or $D_1+(D_{max\_1}-D_1)/c'$ for $p'$ and $c'$ as defined above.

Typically, the processor computes the relationship by regressing (e.g., linearly regressing) the R-to-end-of-T interval, or another variable (e.g., $D_{rec}$) derived therefrom, on the RR interval. Thus, for example, the processor may compute a function $D_{rec}=ax+b$ or $D=sX+t$.

Figure 2:
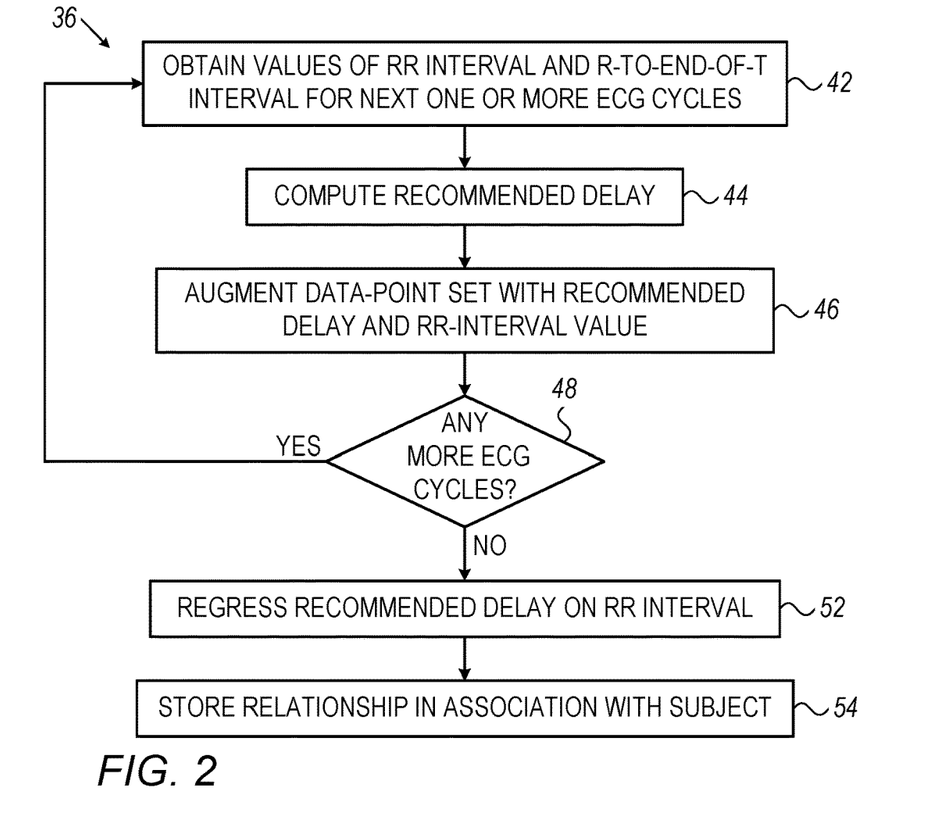
FIG. 2 is a flow diagram for a method for computing a relationship for use in computing a recommended PFA delay, in accordance with some examples of the present disclosure.

By way of example, reference is now made to FIG. 2, which is a flow diagram for a method 36, executed by the processor, for computing a relationship for use in computing a recommended PFA delay, in accordance with some examples of the present disclosure.

Method 36 comprises a value-obtaining step 42, at which the processor obtains a pair of values $(X_i, D_i)$ for one or more ECG cycles of the patient. In some examples, the processor executes value-obtaining step 42 by computing the pair of values as described below with reference to FIG. 3. In other examples, the processor executes value-obtaining step 42 by loading the pair of values from memory 35 (FIG. 1).

Following value-obtaining step 42, the processor, at a delay-computing step 44, computes the recommended delay based on the values, e.g., per equation (1). Subsequently, at an augmenting step 46, the processor augments a data-point set with the recommended delay and RR-interval value. The processor then checks, at a checking step 48, whether any more ECG cycles are available. If yes, the processor returns to value-obtaining step 42. Otherwise, the processor computes the relationship by regressing the recommended delay on the RR interval at a regressing step 52.

In other examples, the processor obtains the values for all of the ECG cycles with a single execution of value-obtaining step 42.

Subsequently to computing the relationship, the processor, at a storing step 54, stores the relationship in association with the patient in memory 35 (FIG. 1).

Figure 3:
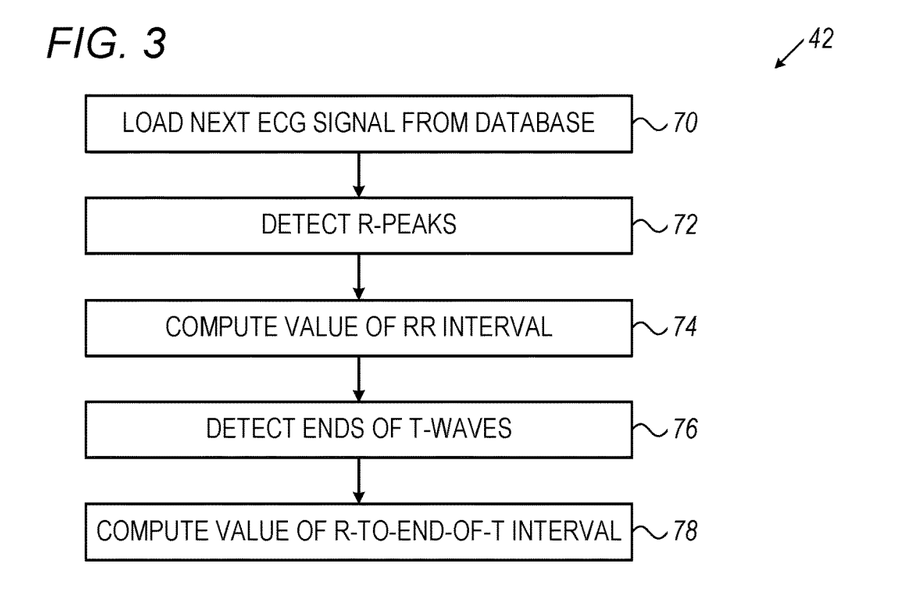
FIG. 3 is a flow diagram for a value-obtaining step shown in FIG. 2, in accordance with some examples of the present disclosure.

Reference is now made to FIG. 3, which is a flow diagram for value-obtaining step 42, in accordance with some examples of the present disclosure.

In some examples, value-obtaining step 42 begins with a signal-loading step 70, at which the processor loads an ECG signal, representing at least two ECG cycles of the patient, from a database. (At least two ECG cycles are required to compute an RR interval.)

Subsequently to loading the signal, the processor detects the R-peaks in the signal, e.g., using any suitable peak-detection algorithm, at a detecting step 72. Based on the timings of these R-peaks, the processor, at an interval-computing step 74, computes the value of the RR interval for a single cycle, or an average of such values over multiple cycles. (The RR interval for a given cycle may be defined, for example, as the interval between the R-peak of the cycle immediately preceding the given cycle and the R-peak of the given cycle.)

In addition, at another detecting step 76, the processor detects the ends of the T-waves in the signal, e.g., using any suitable machine-learned model. Based on the timings of the T-wave ends, the processor, at another interval-computing step 78, computes the value of the R-to-end-of-T interval for the same cycle (s) for which the value of the RR interval was computed.

Alternatively, the end-of-T-wave timings may be manually identified in the ECG signals prior to the execution of value-obtaining step 42. Subsequently, instead of detecting step 76, the processor may simply load these timings. Alternatively or additionally, the R-peaks may be manually identified, or identified by recorder 11 (FIG. 1).

Applying PFA Using the Relationship

Figure 4:
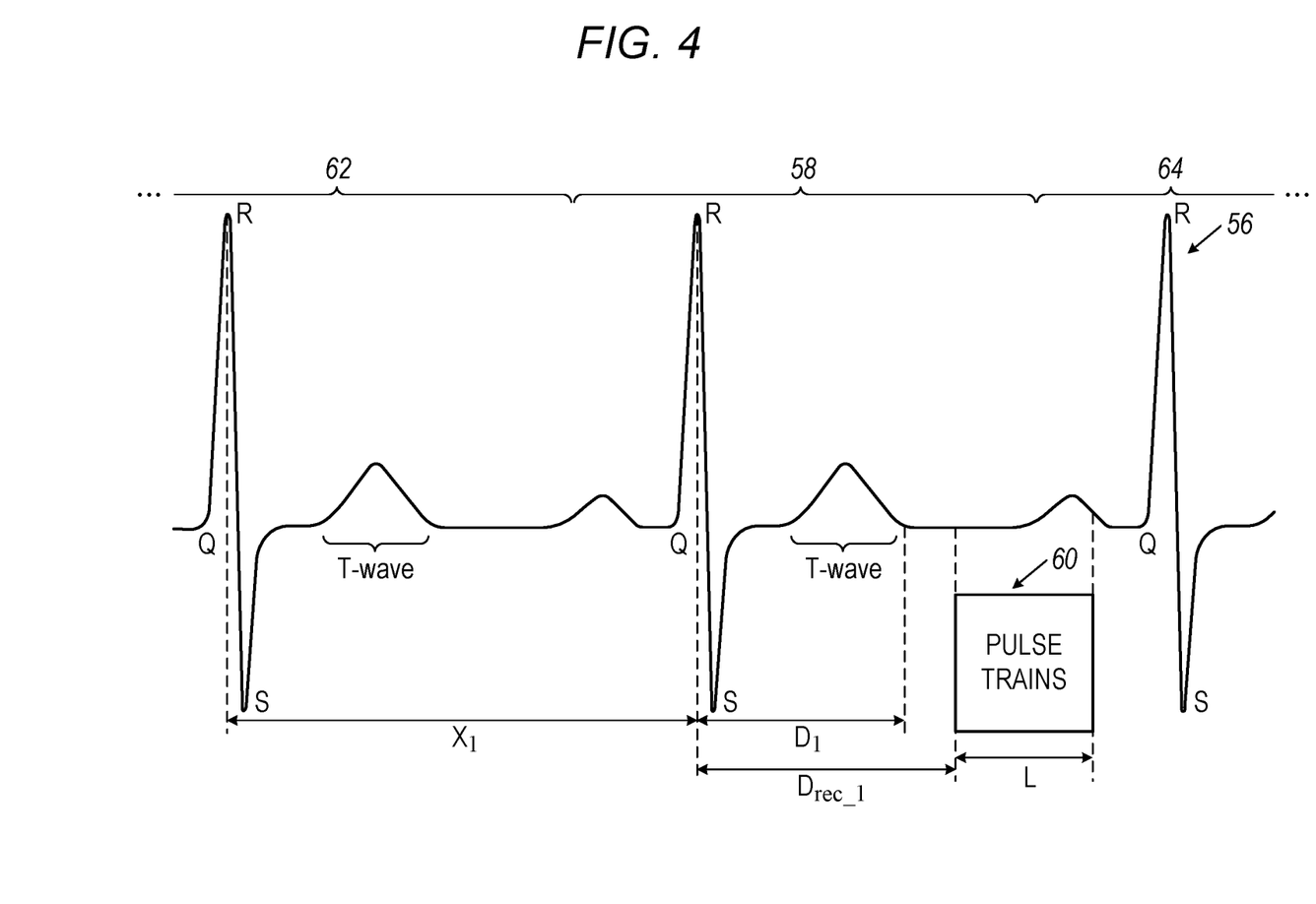
FIG. 4 is a schematic illustration of an application of PFA, in accordance with some examples of the present disclosure.
Figure 5:
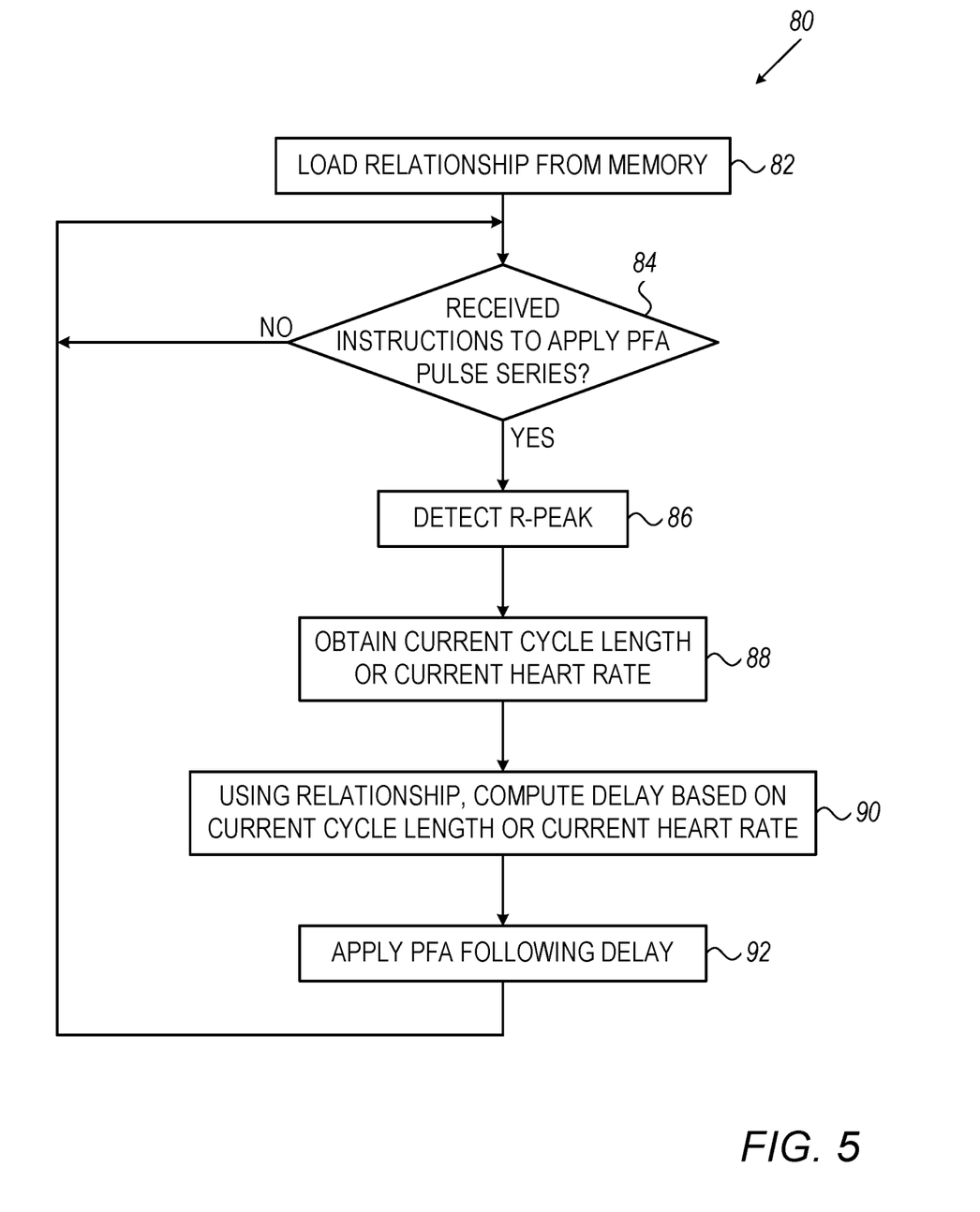
FIG. 5 is a flow diagram for a method for applying PFA, in accordance with some examples of the present disclosure.

Reference is now made to FIG. 4, which is a schematic illustration of an application of PFA, in accordance with some examples of the present disclosure. Reference is further made to FIG. 5, which is a flow diagram for a method 80 for applying PFA, in accordance with some examples of the present disclosure.

FIG. 4 depicts several cycles of an ECG signal 56, which was acquired from patient 23 (FIG. 1), during a cardiac PFA procedure, following the computation of a relationship for use in computing the recommended delay for the patient. For reference, FIG. 4 labels the QRS-wave and T-wave of an ECG cycle 58, along with $D_1$, the delay from the R-peak of the QRS-wave in cycle 58 to the end of the T-wave in the cycle.

Using the relationship that was stored for the patient, the processor applies PFA to the heart of the patient, the application beginning during cycle 58. For example, the processor may cause catheter 14 (FIG. 1), or any other suitable ablation catheter, to apply one or more PFA pulses, such as one or more PFA pulse trains 60, to the tissue of the heart during a time window having the duration L and beginning during cycle 58. (As illustrated in FIG. 4, the time window may end during the next ECG cycle 64.)

More specifically, at a relationship-loading step 82, the processor loads the relationship from the memory. Subsequently, at a checking step 84, the processor continually checks whether the physician input instructions to apply a PFA series of pulse trains to the patient. Upon receiving the instructions, the processor detects the R-peak in ECG cycle 58 at an R-peak-detecting step 86.

At an obtaining step 88, the processor obtains the current cycle length or current heart rate of the patient, i.e., the cycle length or heart rate at the time of the ablation procedure. For example, the processor may calculate $X_1$, the current RR interval, which is a measure of the current cycle length. (Although obtaining step 88 may be executed prior to R-peak-detecting step 86, an advantage of executing obtaining step 88 after R-peak-detecting step 86 is that the calculation of $X_1$ may be based on the timing of the most recent R-peak, i.e., the R-peak in ECG cycle 58.) Alternatively, the processor may obtain a measure of the current cycle length, such as $X_1$, or the current heart rate, from recorder 11 (FIG. 1).

In some examples, $X_1$ is calculated as the duration from the R-peak of the preceding ECG cycle 62 to the R-peak of cycle 58. Alternatively, $X_1$ may be calculated as an average RR interval over multiple pairs of successive ECG cycles.

Subsequently, the processor, at a delay-computing step 90, uses the relationship to compute the recommended delay $D_{rec\_1}$ based on the current cycle length or current heart rate. (If the relationship is in the form of a lookup table, this computation may include a simple lookup operation.) For example, the processor may substitute $X_1$, any other measure of the current cycle length, or the inverse of the current heart rate for X in the relationship $D_{rec}=aX+b$.

Subsequently, at a PFA-applying step 92, following the recommended delay, the processor applies PFA to the heart during the time window. The processor then returns to checking step 84. Optionally, if the instructions to apply the next pulse series are received within a threshold number of cardiac cycles, the processor may proceed directly to PFA-applying step 92 without first recomputing the recommended delay, given that the recommended delay is unlikely to change over a short time.

EXAMPLES

The following examples relate to various non-exhaustive ways in which the teachings herein may be combined or applied. It should be understood that the following examples are not intended to restrict the coverage of any claims that may be presented at any time this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A system (10) includes a memory (35) and a processor (34). The processor is configured to obtain respective values of an R-to-end-of-T interval and an RR interval for multiple electrocardiogram (ECG) cycles of a patient (23). The processor is further configured to compute, based on the obtained values, a relationship between the RR interval and the R-to-end-of-T interval or another variable derived from the R-to-end-of-T interval, the relationship being for use in computing a delay from an R-peak of any subsequent ECG cycle (58) of the patient to a time window in which to apply pulsed field ablation (PFA) to a heart (12) of the patient such that the time window is expected to start after an end of a T-wave of the subsequent ECG cycle and to end prior to a QRS-wave of the patient immediately following the subsequent ECG cycle. The processor is further configured to, subsequently to computing the relationship and during a PFA procedure, obtain a current cycle length or current heart rate of the patient, compute the delay based on the current cycle length or current heart rate using the relationship, and apply PFA to the heart during the time window following the delay.

Example 2

The system (10) according to Example 1, wherein the processor (34) is configured to obtain the values of the R-to-end-of-T interval by computing the values of the R-to-end-of-T interval based on respective end-of-T-wave timings that were manually identified in one or more ECG signals representing the ECG cycles.

Example 3

The system according to Example 1, wherein a duration of the time window is between 200 and 300 ms.

Example 4

The system (10) according to any one of Examples 1-3, wherein the processor (34) is configured to compute the relationship by regressing the R-to-end-of-T interval or the other variable on the RR interval.

Example 5

The system according to Example 4, wherein the regressing includes linearly regressing.

Example 6

The system according to any one of Examples 1-5, wherein the relationship is between the RR interval and $D_{min}+|D_{max}-D_{min}|/c$,
   $D_{min}$ being $p*D$,
      D being the R-to-end-of-T interval and p being a predefined constant that is greater than or equal to one,
   $D_{max}$ being $X-L$,
      X being the RR interval and L being a duration of the time window, and
   c being another predefined constant that is greater than or equal to one.

Example 7

A method includes obtaining respective values of an R-to-end-of-T interval and an RR interval for multiple electrocardiogram (ECG) cycles of a patient (23). The method further includes, based on the obtained values, computing a relationship between the RR interval and the R-to-end-of-T interval or another variable derived from the R-to-end-of-T interval, the relationship being for use in computing a delay from an R-peak of any subsequent ECG cycle (58) of the patient to a time window in which to apply pulsed field ablation (PFA) to a heart (12) of the patient such that the time window is expected to start after an end of a T-wave of the subsequent ECG cycle and to end prior to a QRS-wave of the patient immediately following the subsequent ECG cycle. The method further includes, subsequently to computing the relationship and during a PFA procedure, obtaining a current cycle length or current heart rate of the patient, using the relationship, computing the delay based on the current cycle length or current heart rate, and following the delay, applying PFA to the heart during the time window.

Example 8

The method according to Example 7, wherein obtaining the values of the R-to-end-of-T interval includes computing the values of the R-to-end-of-T interval based on respective end-of-T-wave timings that were manually identified in one or more ECG signals representing the ECG cycles.

Example 9

The method according to Example 7, wherein a duration of the time window is between 200 and 300 ms.

Example 10

The method according to any one of Examples 7-9, wherein computing the relationship includes computing the relationship by regressing the R-to-end-of-T interval or the other variable on the RR interval.

Example 11

The method according to Example 10, wherein the regressing includes linearly regressing.

Example 12

The method according to any one of Examples 7-11, wherein the relationship is between the RR interval and $D_{min}+|D_{max}-D_{min}|/c$,
- $D_{min}$ being $p*D$,
    - D being the R-to-end-of-T interval and p being a predefined constant that is greater than or equal to one, $D_{max}$ being X−L,
    - X being the RR interval and L being a duration of the time window, and
- c being another predefined constant that is greater than or equal to one.

Example 13

A computer software product includes a tangible non-transitory computer-readable medium in which program instructions are stored. The instructions, when read by a processor (34), cause the processor to obtain respective values of an R-to-end-of-T interval and an RR interval for multiple electrocardiogram (ECG) cycles of a patient (23). The instructions further cause the processor to compute, based on the obtained values, a relationship between the RR interval and the R-to-end-of-T interval or another variable derived from the R-to-end-of-T interval, the relationship being for use in computing a delay from an R-peak of any subsequent ECG cycle (58) of the patient to a time window in which to apply pulsed field ablation (PFA) to a heart (12) of the patient such that the time window is expected to start after an end of a T-wave of the subsequent ECG cycle and to end prior to a QRS-wave of the patient immediately following the subsequent ECG cycle. The instructions further cause the processor, subsequently to computing the relationship and during a PFA procedure, to obtain a current cycle length or current heart rate of the patient, to compute the delay, using the relationship, based on the current cycle length or current heart rate, and to apply PFA to the heart during the time window following the delay.

Example 14

The computer software product according to Example 13, wherein the instructions cause the processor (34) to obtain the values of the R-to-end-of-T interval by computing the values of the R-to-end-of-T interval based on respective end-of-T-wave timings that were manually identified in one or more ECG signals representing the ECG cycles.

Example 15

The computer software product according to Example 13, wherein a duration of the time window is between 200 and 300 ms.

Example 16

The computer software product according to any one of Examples 13-15, wherein the instructions cause the processor (34) to compute the relationship by regressing the R-to-end-of-T interval or the other variable on the RR interval.

Example 17

The computer software product according to Example 16, wherein the regressing includes linearly regressing.

Example 18

The computer software product according to any one of Examples 13-17, wherein the relationship is between the RR interval and $D_{min}+|D_{max}-D_{min}|/c$,
- $D_{min}$ being $p*D$,
    - D being the R-to-end-of-T interval and p being a predefined constant that is greater than or equal to one,
- $D_{max}$ being X−L,
    - X being the RR interval and L being a duration of the time window, and
- c being another predefined constant that is greater than or equal to one.

It will be appreciated by persons skilled in the art that the present disclosure is not limited to what has been particularly shown and described hereinabove. Rather, the scope of the present disclosure includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A system, comprising:
   a memory; and
   a processor, configured to:
      obtain respective values of an R-to-end-of-T interval and an RR interval for multiple electrocardiogram (ECG) cycles of a patient, based on the obtained values, compute a relationship between the RR interval and the R-to-end-of-T interval or another variable derived from the R-to-end-of-T interval, the relationship being for use in computing a delay from an R-peak of any subsequent ECG cycle of the patient to a time window in which to apply pulsed field ablation (PFA) to a heart of the patient such that the time window is expected to start after an end of a T-wave of the subsequent ECG cycle and to end prior to a QRS-wave of the patient immediately following the subsequent ECG cycle, and storing the relationship in the memory in association with the patient, and during a PFA procedure:

obtain a current cycle length or current heart rate of the patient, using the relationship stored in the memory to compute the delay based on the current cycle length or current heart rate, and following the delay, apply PFA to the heart during the time window.

2. The system according to claim 1, wherein the processor is configured to obtain the values of the R-to-end-of-T interval by computing the values of the R-to-end-of-T interval based on respective end-of-T-wave timings that were manually identified in one or more ECG signals representing the ECG cycles.

3. The system according to claim 1, wherein a duration of the time window is between 200 and 300 ms.

4. The system according to claim 1, wherein the processor is configured to compute the relationship by regressing the R-to-end-of-T interval or the other variable on the RR interval.

5. The system according to claim 4, wherein the regressing includes linearly regressing.

6. The system according to claim 1, wherein the relationship is between the RR interval and $D_{min}+|D_{max}-D_{min}|/c$, $D_{min}$ being $p*D$, D being the R-to-end-of-T interval and p being a predefined constant that is greater than or equal to one, $D_{max}$ being X–L, X being the RR interval and L being a duration of the time window, and c being another predefined constant that is greater than or equal to one.

7. A method, comprising:

obtaining respective values of an R-to-end-of-T interval and an RR interval for multiple electrocardiogram (ECG) cycles of a patient;

based on the obtained values, computing a relationship between the RR interval and the R-to-end-of-T interval or another variable derived from the R-to-end-of-T interval, the relationship being for use in computing a delay from an R-peak of any subsequent ECG cycle of the patient to a time window in which to apply pulsed field ablation (PFA) to a heart of the patient such that the time window is expected to start after an end of a T-wave of the subsequent ECG cycle and to end prior to a QRS-wave of the patient immediately following the subsequent ECG cycle; and subsequently to computing the relationship, during a PFA procedure:

obtaining a current cycle length or current heart rate of the patient, using the relationship, computing the delay based on the current cycle length or current heart rate, and following the delay, applying PFA to the heart during the time window.

8. The method according to claim 7, wherein obtaining the values of the R-to-end-of-T interval comprises computing the values of the R-to-end-of-T interval based on respective end-of-T-wave timings that were manually identified in one or more ECG signals representing the ECG cycles.

9. The method according to claim 7, wherein a duration of the time window is between 200 and 300 ms.

10. The method according to claim 7, wherein computing the relationship comprises computing the relationship by regressing the R-to-end-of-T interval or the other variable on the RR interval.

11. The method according to claim 10, wherein the regressing comprises linearly regressing.

12. The method according to claim 7, wherein the relationship is between the RR interval and $D_{min}+|D_{max}-D_{min}|/c$, $D_{min}$ being $p*D$, D being the R-to-end-of-T interval and p being a predefined constant that is greater than or equal to one, $D_{max}$ being X–L, X being the RR interval and L being a duration of the time window, and c being another predefined constant that is greater than or equal to one.

13. A computer software product comprising a tangible non-transitory computer-readable medium in which program instructions are stored, which instructions, when read by a processor, cause the processor to:

obtain respective values of an R-to-end-of-T interval and an RR interval for multiple electrocardiogram (ECG) cycles of a patient, based on the obtained values, compute a relationship between the RR interval and the R-to-end-of-T interval or another variable derived from the R-to-end-of-T interval, the relationship being for use in computing a delay from an R-peak of any subsequent ECG cycle of the patient to a time window in which to apply pulsed field ablation (PFA) to a heart of the patient such that the time window is expected to start after an end of a T-wave of the subsequent ECG cycle and to end prior to a QRS-wave of the patient immediately following the subsequent ECG cycle, and subsequently to computing the relationship, during a PFA procedure:

obtain a current cycle length or current heart rate of the patient, using the relationship, compute the delay based on the current cycle length or current heart rate, and following the delay, apply PFA to the heart during the time window.

14. The computer software product according to claim 13, wherein the instructions cause the processor to obtain the values of the R-to-end-of-T interval by computing the values of the R-to-end-of-T interval based on respective end-of-T-wave timings that were manually identified in one or more ECG signals representing the ECG cycles.

15. The computer software product according to claim 13, wherein a duration of the time window is between 200 and 300 ms.

16. The computer software product according to claim 13, wherein the instructions cause the processor to compute the relationship by regressing the R-to-end-of-T interval or the other variable on the RR interval.

17. The computer software product according to claim 16, wherein the regressing includes linearly regressing.

18. The computer software product according to claim 13, wherein the relationship is between the RR interval and $D_{min}+|D_{max}-D_{min}|/c$, $D_{min}$ being $p*D$,
- D being the R-to-end-of-T interval and p being a predefined constant that is greater than or equal to one, $D_{max}$ being $X-L$,
- X being the RR interval and L being a duration of the time window, and c being another predefined constant that is greater than or equal to one.

\* \* \* \* \*